(12) United States Patent
Warren

(10) Patent No.: US 7,815,487 B2
(45) Date of Patent: Oct. 19, 2010

(54) SPOT FUSED FOAM CUP

(75) Inventor: Roger D. Warren, Claremont, NC (US)

(73) Assignee: HBI Branded Apparel Enterprise, LLC, Winston-Salem, NC (US)

( * ) Notice: Subject to any disclaimer, the term of this patent is extended or adjusted under 35 U.S.C. 154(b) by 650 days.

(21) Appl. No.: 11/800,278

(22) Filed: May 4, 2007

(65) Prior Publication Data

US 2008/0194180 A1 Aug. 14, 2008

(51) Int. Cl.
*A41C 3/00* (2006.01)

(52) U.S. Cl. .............................. 450/39; 450/57; 450/54; 2/267

(58) Field of Classification Search ............. 450/36–38, 450/54–57; 2/267, 268, 455, 456, 465, 466
See application file for complete search history.

(56) References Cited

U.S. PATENT DOCUMENTS

| | | | | |
|---|---|---|---|---|
| 3,934,593 A | * | 1/1976 | Mellinger | .................... 450/56 |
| 7,214,120 B2 | * | 5/2007 | Kaye et al. | ..................... 450/1 |
| 7,229,335 B2 | * | 6/2007 | Davis | ........................... 450/81 |
| 7,244,167 B2 | * | 7/2007 | Falla | ........................... 450/54 |
| 2004/0224603 A1 | * | 11/2004 | Kaye et al. | ..................... 450/1 |
| 2005/0020183 A1 | * | 1/2005 | Falla | ........................... 450/39 |
| 2005/0255789 A1 | | 11/2005 | Gaudet et al. | ................. 450/41 |
| 2006/0252342 A1 | * | 11/2006 | Davis | ........................... 450/81 |

* cited by examiner

*Primary Examiner*—Gloria Hale
(74) *Attorney, Agent, or Firm*—Womble Carlyle Sandridge & Rice, PLLC

(57) ABSTRACT

A pad for a brassiere has a first layer; a second layer; and an intermediate layer between the first layer and the second layer. The first layer, the second layer and the intermediate layer are connected at predetermined locations to form a first plurality of depressions on the first layer and a second plurality of depressions on the second layer. The brassiere has a pair of back panels, a pair of shoulder straps, and a pair of breast receiving cups. Each of the pair of breast receiving cups has a first layer; a second layer; and an intermediate layer between the first layer and the second layer. The first layer, the second layer and the intermediate layer are connected to form a first plurality of depressions on said first layer and a second plurality of depressions on said second layer.

17 Claims, 6 Drawing Sheets

SPOT FUSED FOAM CUP

BACKGROUND OF THE INVENTION

1. Field of the Invention

The present disclosure relates to a pad for a brassiere or material for other garments. More particularly, the present disclosure relates to a pad for a brassiere or material for other garments that have dimpled surfaces to enhance functionality. Still more particularly, the present disclosure relates to a pad for a brassiere or material for other garments that have dimpled surfaces that are formed by an ultrasonic welding process to enhance breathability and comfort of the brassiere or other garment.

2. Related Art

Garments, and particularly athletic garments, should be designed to accommodate a variety of functions such as providing comfort, cooling and movement. In addition to these expected functions, the garment should also provide the necessary modesty and support. Consumers expect these functions, particularly in garments used during athletics, to prevent discomfort during movement and overheating. For manufacturers to satisfy their consumers, the desired attributes must be balanced against production costs in order to produce an undergarment that is competitive in the market.

For example, brassieres for athletic purposes are often constricting and heavily elasticized to provide support and compression during movement. This degree of constriction often prevents movement and causes discomfort and chafing around the arms and beneath the bosom of the wearer. Further, the heavily elasticized material prevents the movement of moisture away from the body during exertion. If such a brassiere has a traditionally laminated pad, the necessary, flexibility and breathability may not be adequate for substantial movement or exertion during athletic activity.

Therefore, a need exists for a laminated pad for a brassiere or material for other garment that provides the needed breathability and support together with the required stretchability and comfort during athletic activity.

SUMMARY OF THE INVENTION

The present disclosure provides a laminated pad for a brassiere that has a dimpled outer and inner surface, the inner and outer surfaces of the pad enclosed within the brassiere structure.

The present disclosure also provides for a laminated pad having a surface that is capable of wicking moisture away from the body of the wearer.

The present disclosure further provides for a laminated and molded brassiere pad that is capable of offering stretchability and breathability to a wearer during athletic movement.

The present disclosure still further provides for a pad for a brassiere that is spot fused during a lamination to create a dimpled effect on the inner and outer surfaces thereof.

The present disclosure yet further provides for a pad for a brassiere having a dimpled outer and inner surface that provides a degree of modesty to the wearer when worn beneath clothing.

The present disclosure further still provides for a laminated pad for a brassiere or material for other garment that transports moisture and heat away from the body of the wearer.

The present disclosure also provides for a laminated pad for a brassiere or other undergarment that offers a cooling and massaging effect to the skin of the wearer.

The present disclosure also provides for a laminated pad for a brassiere or other undergarment that has a rigid inner and outer surfaces for support of the wearer.

BRIEF DESCRIPTION OF THE DRAWINGS

There and other objects and advantages of the present disclosure will be more apparent from the following detailed explanation of the preferred embodiments of the invention in connection with the accompanying drawings.

DETAILED DESCRIPTION OF THE INVENTION

Figure 1:
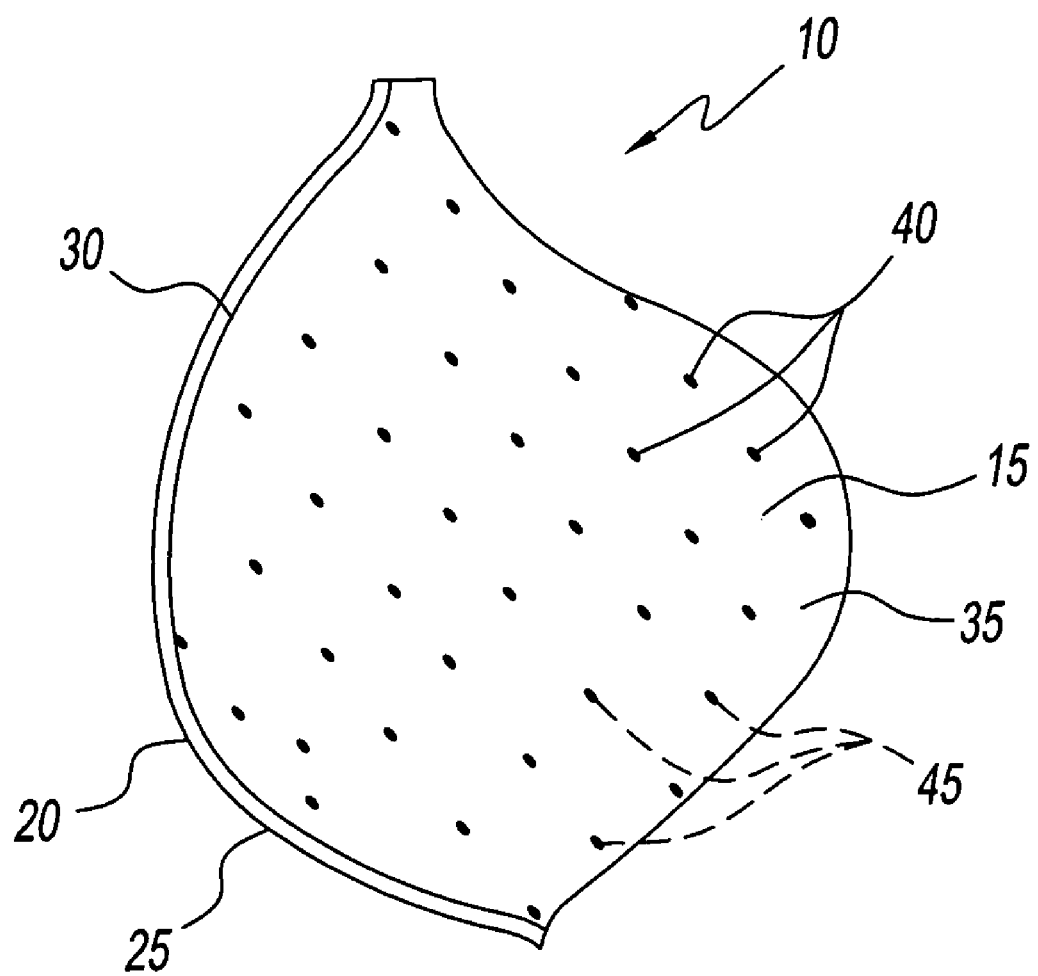
FIG. 1 illustrates a perspective view of the breast pad according to the present invention.
Figure 2:
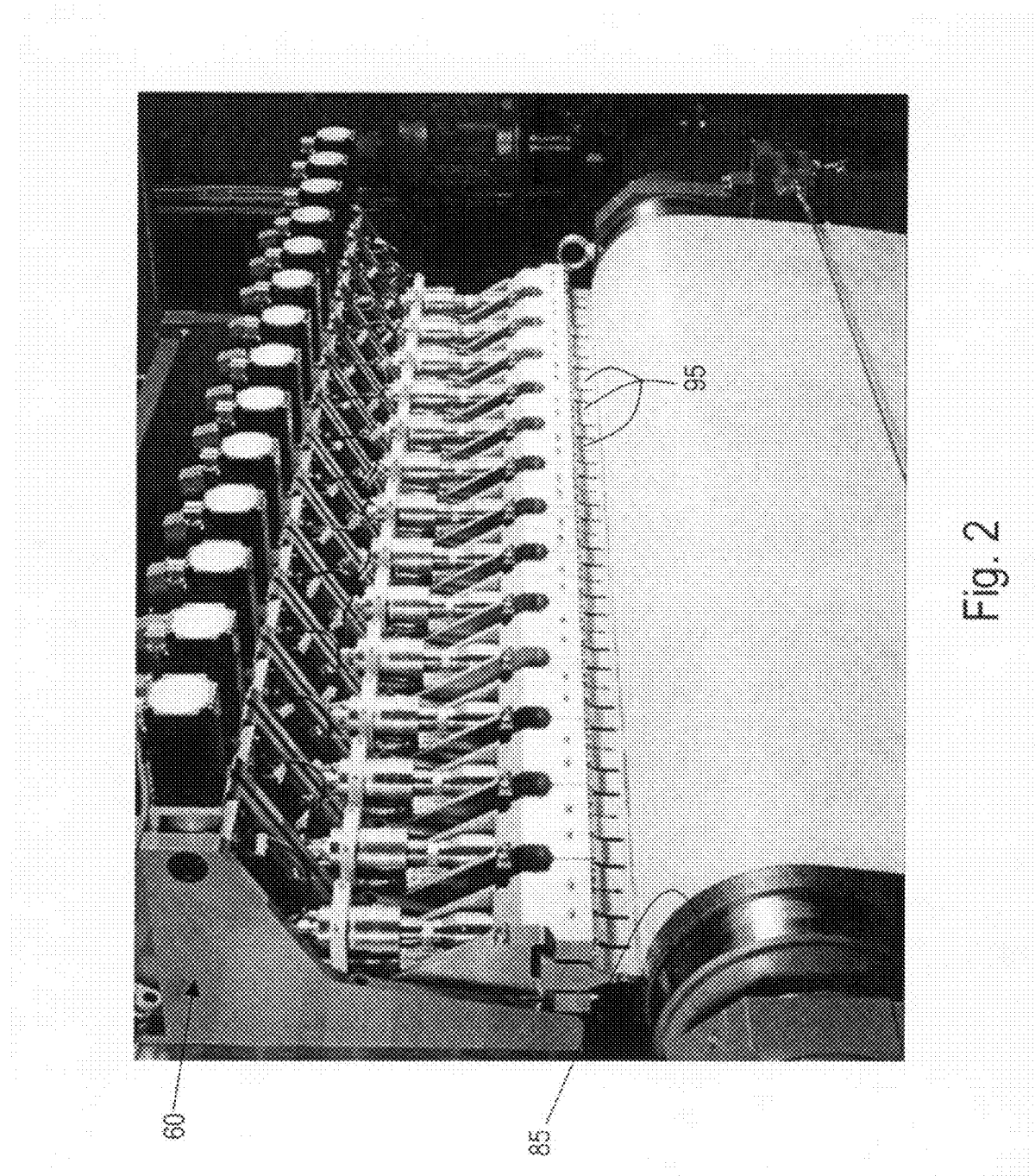
FIG. 2 is a photograph of a lamination machine of the type used to make the laminated fabric of FIG. 3.
Figure 3:
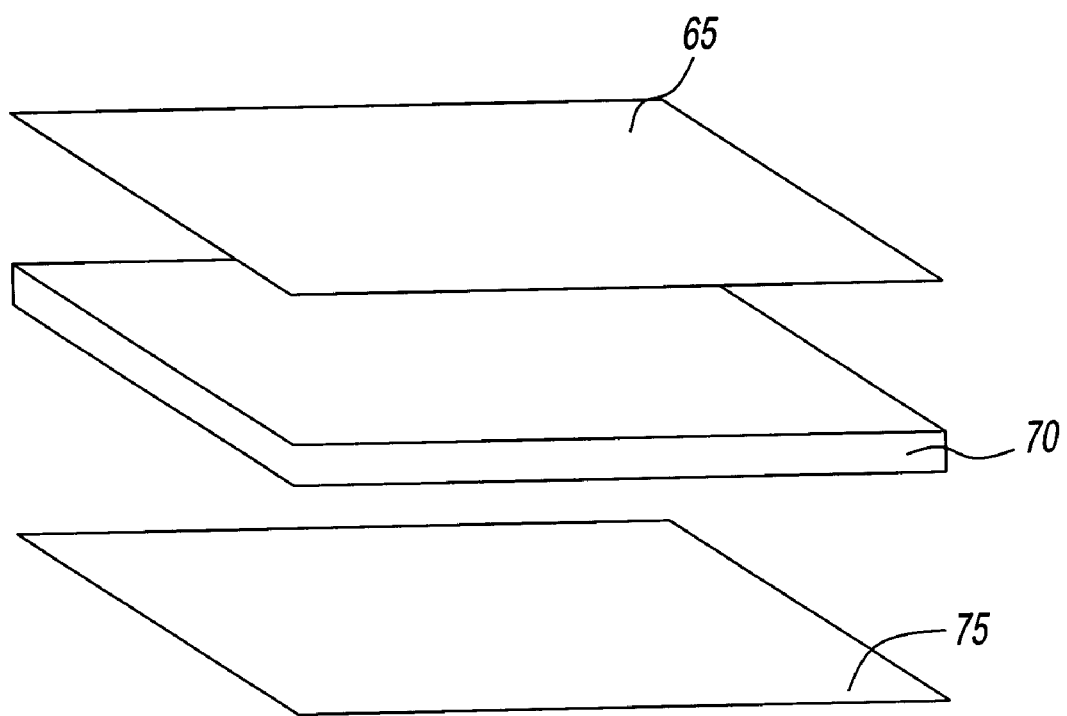
FIG. 3 illustrates layers of fabric used to form the breast pad of FIG. 1, prior to being laminated in the machine of FIG. 2.

Referring to the drawings and, in particular, FIG. 1, there is shown a breast pad, generally represented by reference numeral 10. Breast pad 10 preferably has a three-dimensional shape with a dimpled outer surface 15 and a dimpled inner surface 20. Breast pad 10 is formed from a laminated fabric that is molded to impart the desired cup shape. Breast pad 10 has an inner layer 25, a middle layer 30 and an outer layer 35. Inner layer 25 and outer layer 35 are preferably of the same material although they could also be of different materials. Middle layer 30 is of a lofted material to provide a degree of thickness to breast pad 10.

Breast pad 10 has a number of outer depressions 40 that are located on outer surface 15 and a number of inner depressions 45 that are located on inner surface 20 of breast pad 10. Each outer depression 40 corresponds to one of inner depressions 45. Corresponding depressions 40 and 45 are in close proximity to each other and reduce the thickness of breast pad 10 in predetermined regions to create a dimpled effect on breast pad 10. The outer depressions 40 and inner depressions 45 are each made using a spot fusing ultrasonic lamination method. When corresponding outer depressions 40 and inner depressions 45 are formed, they lie in registration with one another. The dimpled effect produced using the spot fusing ultrasonic method provides functional, as well as aesthetic benefits to the user.

Machine 60 has an anvil 85, and a series of hammers 90 that support a series of individual ultrasonic horns 95. Either anvil 85 or ultrasonic horns 95 vibrate when they are in close proximity to generate substantial heat to melt the fabric fed therethrough.

Figure 4:
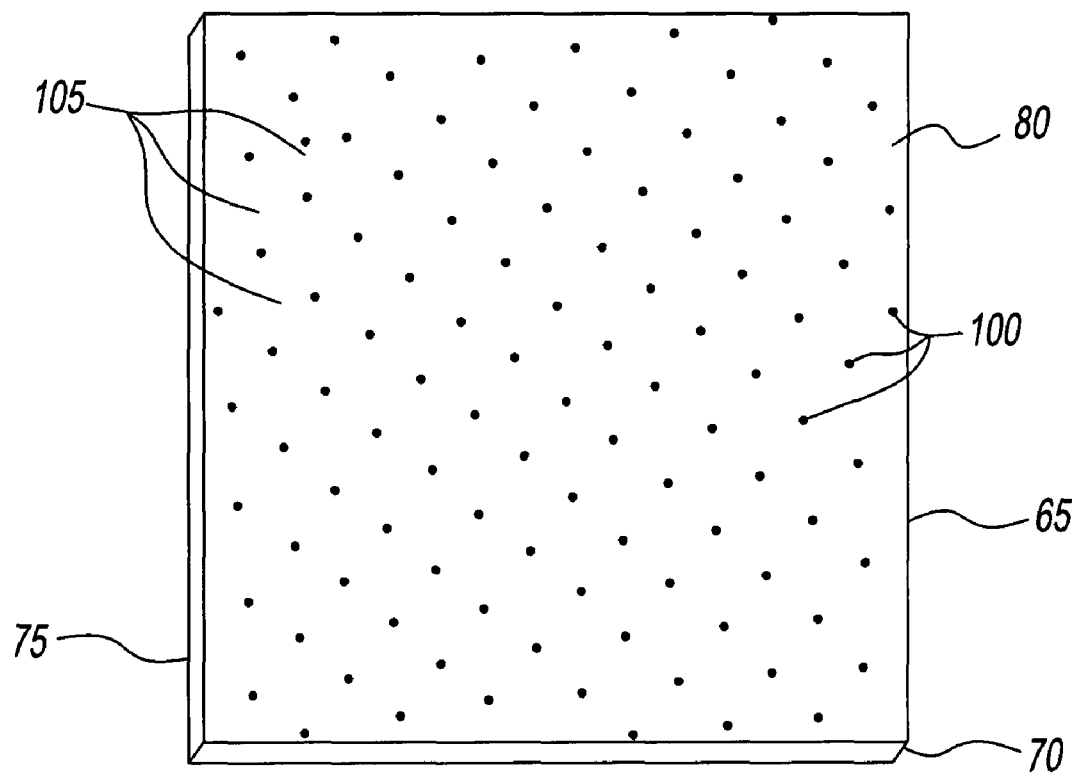
FIG. 4 illustrates a piece of laminated fabric, formed by the machine of FIG. 2, from the layers of fabric of FIG. 3, prior to molding.

According to the present disclosure, a top layer 65, a bottom layer 75 and a middle layer 70 are fed into machine 60 and are laminated to form a three-ply piece of fabric 80. Top and bottom layers 65 and 75 are each preferably made from a synthetic material. Inner layer 70 is preferably a polyurethane foam material that is easily meltable, although other materials having a loft that are easily meltable could also be used. As layers 65, 70 and 75 are fed through machine 60, either anvil 85 or ultrasonic horns 95 are vibrated at an ultrasonic frequency to fuse layers 65, 70 and 75 together. This fusing is achieved by heat generated during the relative vibration between ultrasonic horns 95 and anvil 85. Referring to FIG. 4, the fusing of layers 65, 70 and 75 occurs at the fuse spots 100 where ultrasonic horns 95 are proximate anvil 85. Formed concurrently with fuse spots 100 are mounded regions 105 that are located between fuse spots 100. Mounded regions 105 have the same loft as the non-laminated layer 70.

Fabric 80 acquires a dimpled appearance because the specific locations are fused together as opposed to the entire fabric being fused together as in traditional heated lamination techniques. The ultrasonic horns 95 do not produce a hole through the fabric 80 or any of the layers 65, 70 or 75 during the fusing process. Instead the fuse spots 100 that are present on each side of laminated fabric 80 are areas where the thickness has been substantially reduced due to the melting of middle layer 70. In the mounded regions 105, where fusion does not exist, the properties of layers 65, 70 and 75 are unchanged. Thus, in the preferred embodiment of the present invention, the layers 65 and 75 maintain their stretchability and layer 70 retains its, loft and stretchability. The pattern is shown as a diamond pattern produced by corresponding anvil and hammer. Further, other similar diamond patterns could also be produced with either a greater distance or a lesser distance between adjacent fuse spots 100. A greater distance between fuse spots would create a very soft and plush cup, whereas lesser distance would create a harder cup. Other patterns, such as for example, decorative or floral patterns, could also be produced on the surface of fabric 80 to the extent that the patterns produce corresponding depressions on both sides of fabric 80.

In an alternative embodiment, the outer layers 65 ad 75 could be molded to produce a rigid outer form for breast pad 10. In this embodiment, breast pad 10 would maintain support of the bosom during movement and offer an overall smooth appearance beneath clothing.

Figure 5:
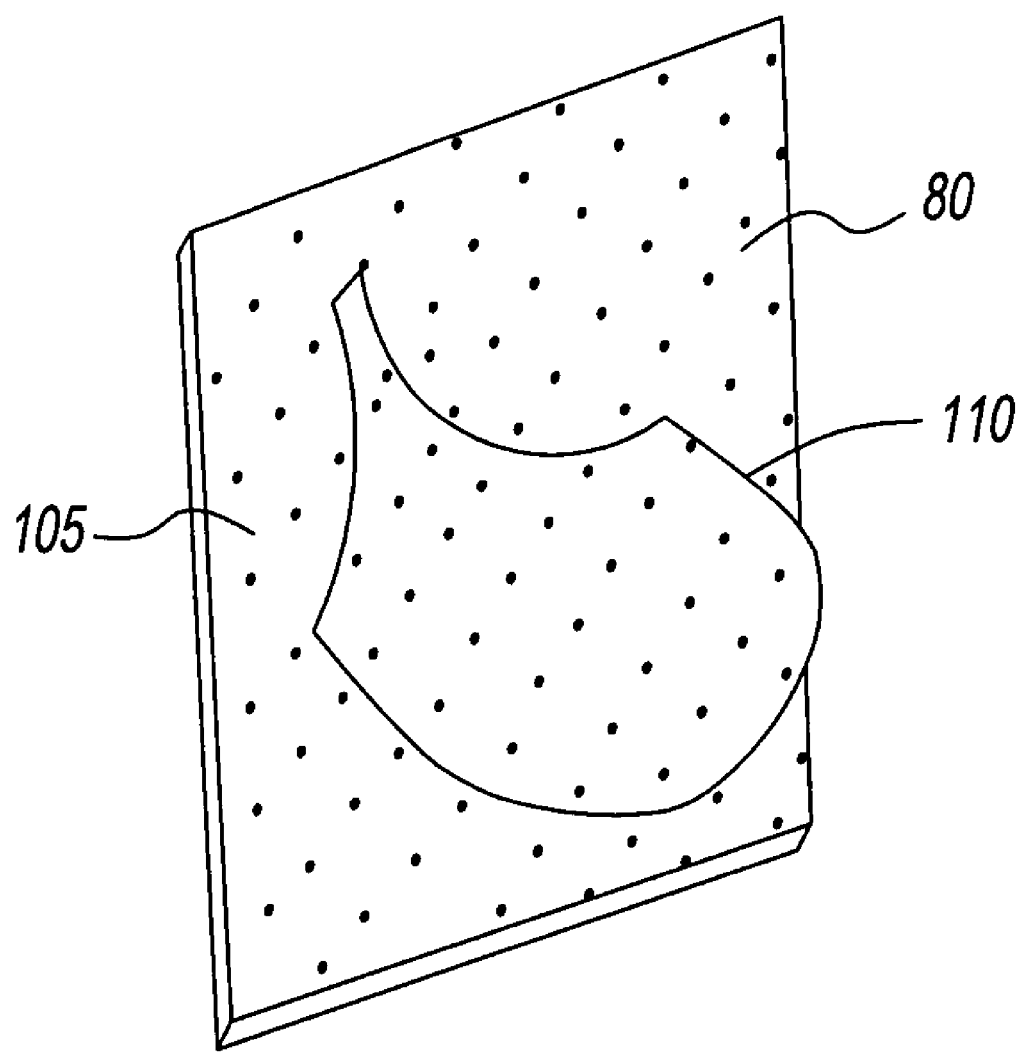
FIG. 5 illustrates a perspective view of the fabric of FIG. 4 after molding.

Referring to FIG. 5, after layers 65, 70 and 75 have been fused, fabric 80 is placed in a mold to form the desired shape of the breast pad 10. The mold is a conventional mold of the type used to provide a predetermined cup-shape 110 to a breast pad 10. The molding process provides the necessary shaping to the breast pad 10. The molding process produces heat to form a cup-shape 110, but not enough to impact the properties of layers 65, 70 and 75. Thus, the resultant breast pad 10 retains the same properties of fabric 80. Thus, the layers 65 and 75 maintain their stretchability and layer 70 retains its loft and stretchability.

Figure 6:
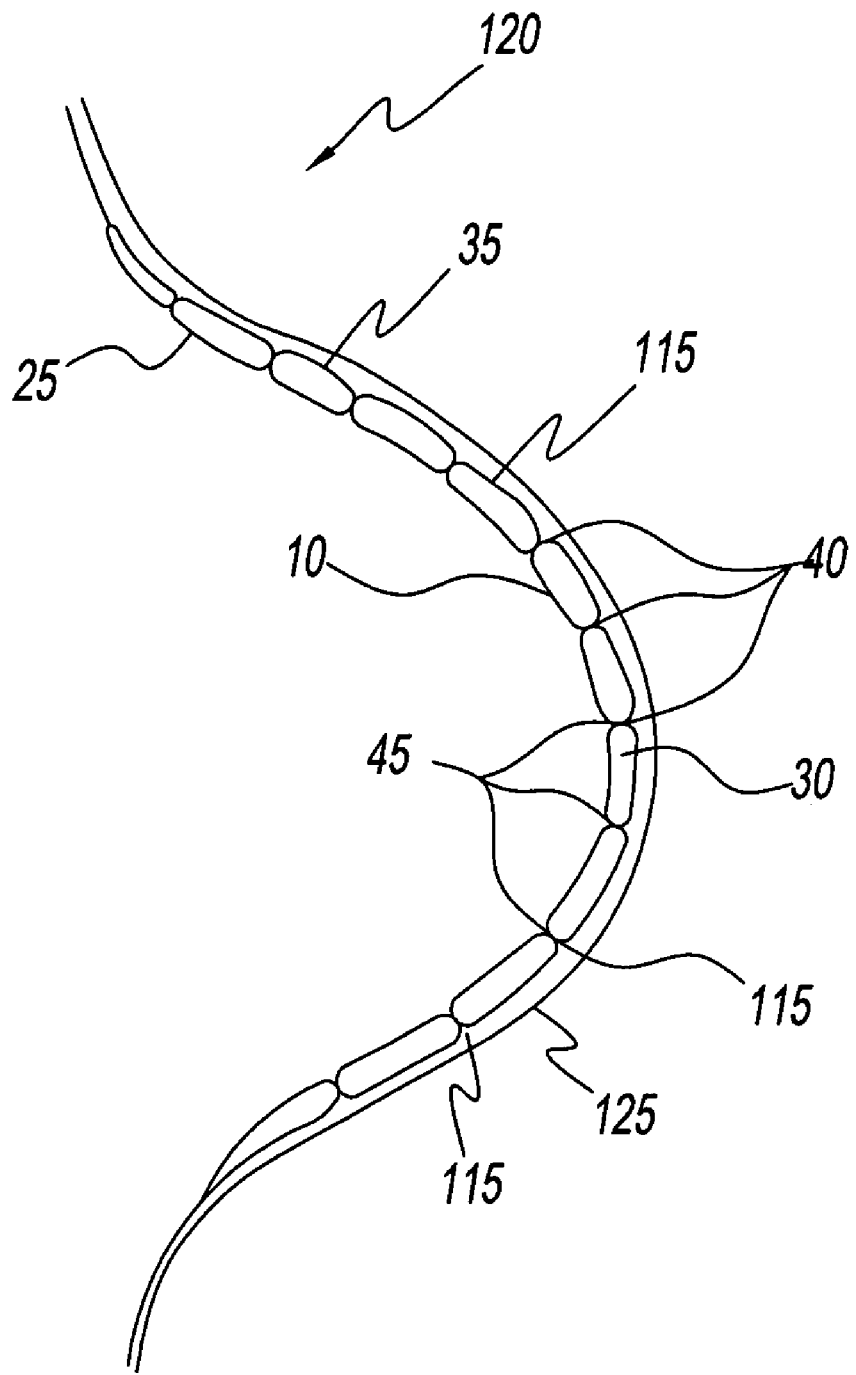
FIG. 6 illustrates a cross-sectional view of the breast pad of FIG. 1 of the present invention, in an athletic brassiere.

Referring to FIG. 6, breast pad 10 has broad applicability. Breast pad 10 is shown connected to an athletic brassiere 120 having an outer fabric covering 125. Pad 10 offers particular benefits, particularly for athletic brassieres. Pad layers 25 and 35 are each made from a synthetic material to enable moisture to be readily wicked away from the surface of the skin. Moisture management is of particular concern when such pads are incorporated into athletic brassiere 120. Layers 25 and 35 are preferably made from a synthetic material such as polyester, nylon or moisture max, although other synthetic materials could also be used that offer similar wicking capabilities.

Additionally, layer 25, which is against the surface of the wearer's skin, offers enhanced breathability to the wearer. Breast pad 10 has a series of air spaces 115 that transport heat away from, the surface of the skin to air condition the skin of the wearer and provide breathability to the brassiere. Air spaces 115 allow for evaporation of moisture during athletic activity. In a traditionally laminated multi-ply breast pad, the inner layer would be entirely against the skin of the wearer and breathability would be substantially reduced. Further, the air gaps keep the surface of the skin of the wearer dryer compared to other athletic brassieres in which the inner layer or liner is fully against the skin of the wearer. The depressions 45 keep the breast pad 10 drier than similar laminated brassiere pads because portions of layer 25 proximate depressions 45 are not in contact with the surface of the wearer's skin.

A further benefit of the spot fused breast pad 10 of the present invention is that it offers the wearer a broad range of movement and comfort. Traditionally, the layers of laminated brassieres are completely fused or adhered to the adjacent layers across their entire surfaces. Breast pad 10 only has a small percentage of the surface areas of each layer 25, 30 and 35, fused to the 20 adjacent layer. The non-connected space is allowed to stretch freely, unimpeded by spot fusing to the next layer. The reduced fused surface area allows the properties of the inner layer 25 and outer layer 35 and middle layer 30 to be optimized for maximum stretch and control to the wearer. The stretchability is of tremendous concern in athletic brassieres to prevent chaffing and discomfort that can often occur. The control of breast pad 10 is preserved even with the lamination because the elastic properties of the materials permit a degree of recoverability in the breast pad 10.

Additionally, depressions 40 and 45 of breast pad 10 offer aesthetic and therapeutic benefits. The dimpled surface of breast pad 10 provides necessary modesty beneath clothing. The non-flat pattern disguises the outline of the bosom by smoothing the profile of the breast of the wearer. Generally, athletic undergarments are worn beneath thin outer clothes and modesty is of particular concern. A similar garment of a fully laminated surface would show the outline of the breasts of the wearer. Further, the movement of the skin beneath the layer 25 produces a therapeutic effect and/or massaging effect.

Although this disclosure has been described as only being used with a brassiere, the spot fused material has broad applicability to other types of undergarments and outer clothes. The fabric formed by the spot fusing process garment could be used in, for example, panties, camisoles, jackets, vests, sweat pants or any other type of garment for which moisture management, breathability and control are a concern.

I claim:

1. A pad for incorporation into a breast receiving cup of a brassiere, comprising:
   an inner layer having an outer surface for wear adjacent a breast of a wearer;
   an outer layer having an outer surface;
   a middle layer between said inner layer and said outer layer,
   said inner layer, said outer layer and said middle layer are fused together at spaced-apart locations to form a first plurality of depressions in the outer surface of said inner layer and a second plurality of depressions in the outer surface of said outer layer, the first and second plurality of depressions forming air spaces in the outer surfaces of said inner and outer layers for transporting heat away from the breast of the wearer.

2. The pad of claim 1, wherein said inner layer, said outer layer and said middle layer are fused together in predetermined locations to impart a quilted appearance to said inner layer and said outer layer.

3. The pad of claim 1, wherein said middle layer further comprises a lofted material.

4. The pad of claim 3, wherein said lofted material is a synthetic lofted material.

5. The pad of claim 1, wherein said inner layer and said outer layer are selected from materials consisting of polyester and nylon.

6. The pad of claim 1, wherein said first plurality of depressions and said second plurality of depressions lie in registration.

7. The pad of claim 1, wherein said inner layer, said outer layer and said middle layer form a stretchable pad.

8. A pad for incorporation into a breast receiving cup of a brassiere comprising
- an inner layer having an outer surface for wear adjacent a breast of a wearer and a first plurality of depressions formed in the outer surface;
- an outer layer having an outer surface and a second plurality of depressions formed in the outer surface;
- a middle between said inner layer and said outer layer;
- the inner layer, outer layer, and middle layer fused together at spaced-apart locations; and
- said each of said first plurality of depressions and each of said second plurality of depressions are in registration to form a pattern on the outer surfaces of said inner layer and said outer layer; the first and second plurality of depressions forming air spaces in the outer surfaces of said inner and outer layers for transporting heat away from the breast of the wearer.

9. The pad of claim 8, wherein said middle layer further comprises a lofted material.

10. The pad of claim 9, wherein said lofted material is a synthetic lofted material.

11. The pad of claim 8, wherein said inner layer and said outer layer are selected from materials consisting of polyester and nylon.

12. A brassiere comprising:
- a pair of back panels;
- a pair of shoulder straps; and
- a pair of breast receiving cups; wherein one of said pair of back panels and one of said pair of shoulder straps are connected to one of said pair of breast receiving cups, and the other of said pair of back panels and the other of said pair of should straps are connected to the other of said pair of breast receiving cups
- each of said pair of breast receiving cups comprises an inner layer having an outer surface for wear adjacent a breast of a wearer, an outer layer having an outer surface, and a middle layer between said inner layer and said outer layer;
- said inner layer, said outer layer and said middle layer are fused together at spaced-apart locations to form a first plurality of depressions in the outer surface of said inner layer and a second plurality of depressions in the outer surface of said second layer; and
- the first and second plurality of depressions forming air spaces in the outer surfaces of said inner and outer layers for transporting heat away from the breast of the wearer.

13. The brassiere of claim 12, wherein each of said first plurality of depressions and each of said second plurality of depressions lie in registration.

14. The brassiere of claim 12, further comprising fabric covering at least one of said first plurality of depressions and said second plurality of depressions.

15. A method of making a pad for incorporation into a breast receiving cup of a brassiere using an ultrasonic welding machine having a series of anvils and horns, comprising:
- feeding an inner layer of fabric having an outer surface, an outer layer of fabric having an outer surface, and a middle layer of fabric into an ultrasonic welding machine;
- activating a series of anvils and horns to fuse said inner layer of fabric, said outer layer of fabric and said middle layer of fabric together at spaced-apart locations to form a laminate having a first plurality of depressions on said outer surface of said inner layer of fabric and a second plurality of depressions on said outer surface of said outer layer of fabric;
- molding said laminate to form a brassiere cup shape;
- cutting said laminate to form a shaped pad; and
- said first plurality of depressions and said second plurality of depressions lie in registration, and form air spaces in the outer surfaces of said inner and outer layers for transporting heat away from the breast of a wearer when saidpad is incorporated into a breast receiving cup.

16. The method of claim 15, wherein said middle layer comprises a meltable material.

17. The method of claim 16, wherein said middle layer of fabric comprises a lofted material.

\* \* \* \* \*